Figure 2:
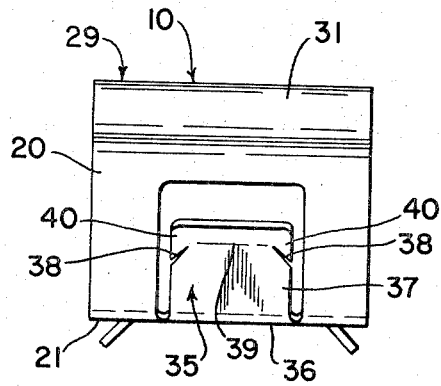

United States Patent [19]

Cumber

[11] 3,804,359

[45] Apr. 16, 1974

[54] CHANNEL CLIPS

[75] Inventor: William J. Cumber, Chardon, Ohio

[73] Assignee: Erico Products, Inc., Cleveland, Ohio

[22] Filed: Feb. 22, 1972

[21] Appl. No.: 228,019

Related U.S. Application Data

[63] Continuation of Ser. No. 859,229, Aug. 13, 1969, abandoned.

[52] U.S. Cl. ........ 248/205 R, 248/229, 248/DIG. 6
[51] Int. Cl. ............................................. H02g 3/12
[58] Field of Search .......... 248/205, 223, 221, 228, 248/229, 72, DIG. 6, 226; 220/3.5, 3.9, 3.92; 287/189.35; 24/73 B, 73 FT

[56]  References Cited
UNITED STATES PATENTS

| | | | |
|---|---|---|---|
| 3,606,223 | 9/1971 | Havener | 248/229 X |
| 2,644,600 | 7/1953 | Senif | 220/3.9 |
| 2,214,388 | 9/1940 | Summers | 287/58 R |
| 2,299,674 | 10/1942 | Austin | 248/DIG. 6 |
| 1,855,751 | 4/1932 | Buchanan | 248/205 R |

FOREIGN PATENTS OR APPLICATIONS 1,475,135  4/1969  Germany........................ 24/73 FT

*Primary Examiner*—J. Franklin Foss
*Attorney, Agent, or Firm*—Adrian Medert

[57]  ABSTRACT

This invention relates to a clip or fastening device for assembly with a channel shaped structural member adapted to be self clamping adjacent one side wall of the channel member for supporting a structural component. The clip includes a body portion which projects from the side wall of the channel having one end thereof provided with prongs which engage beneath the inturned flange on the side wall and an extension which projects toward the base of the channel and terminates in prongs for engaging the same. The clip is resiliently held in position in the channel member between the spaced set of prongs. A suitable attaching member formed either integrally with the body portion or separate therefrom is adapted to receive the edge portion of the wall of the component and secure it to the clip.

16 Claims, 12 Drawing Figures

PATENTED APR 16 1974 3,804,359

SHEET 1 OF 2

INVENTOR.
WILLIAM J. CUMBER

BY

Adrian Medert
ATTORNEY

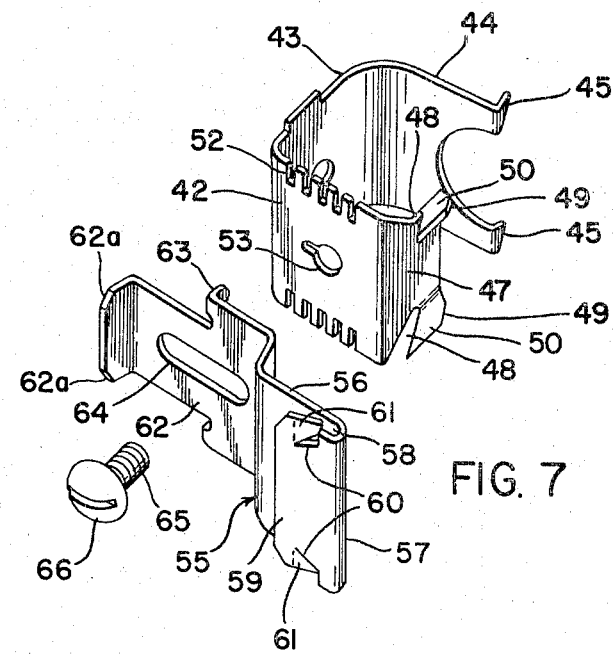
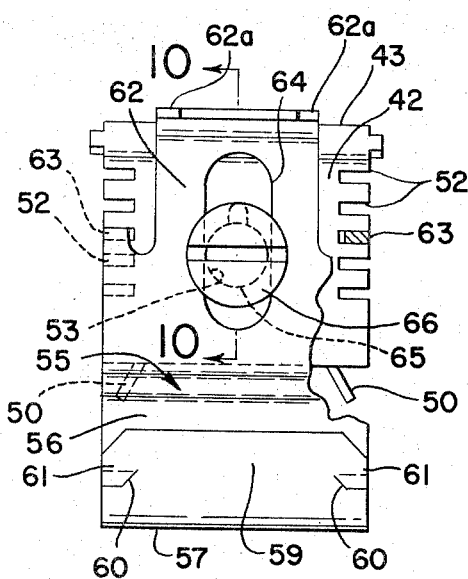
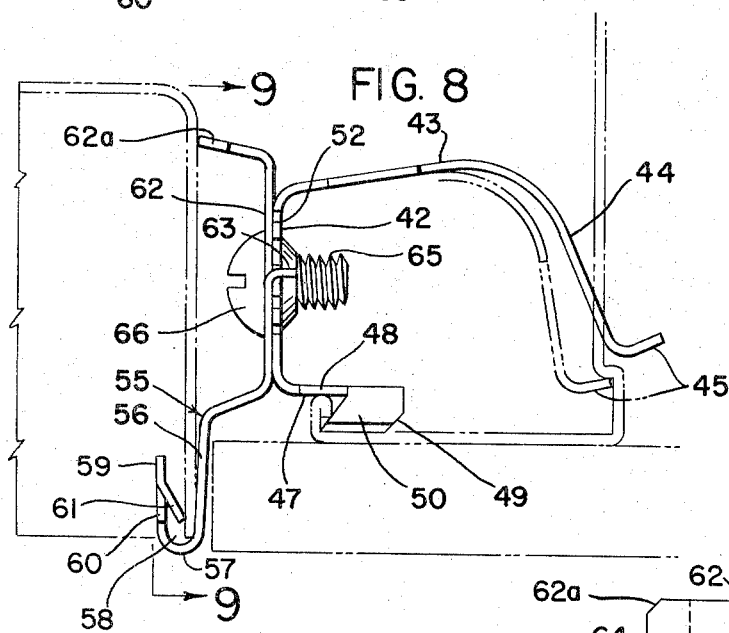
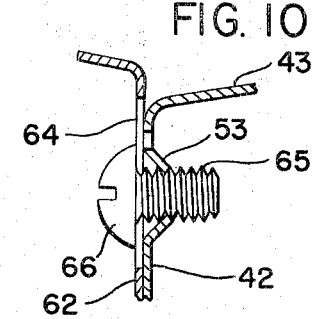
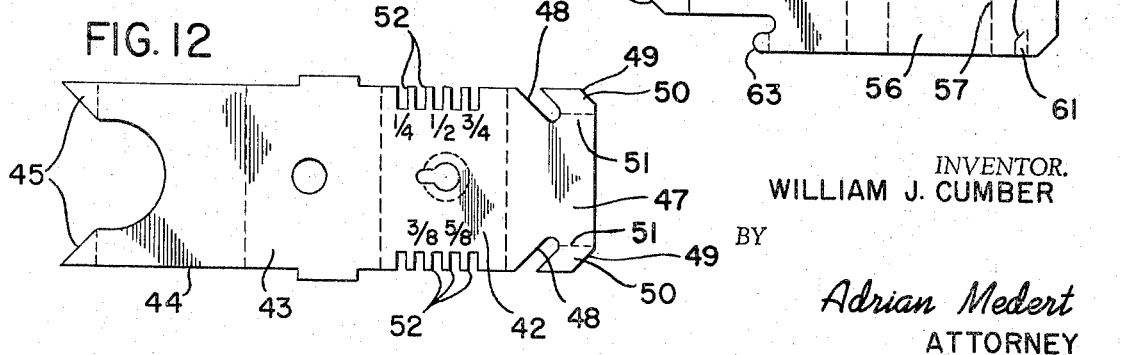

CHANNEL CLIPS

This application is a continuation of my United States patent application Ser. No. 859,229, filed Aug. 13, 1969, for Stud Clip, and now abandoned.

This invention relates to metal fastening devices and more particularly to a fastener in the form of a novel clip member of spring metal, which can be readily applied to a channel shaped structural member or stud for supporting various structural accessories which may take the form of an electrical outlet box or like equipment, cable and conduit within walls or partitions.

Heretofore, in the construction of walls and partitions which embody spaced studding, usually of metal and channel shaped in cross section, it has been the practice to support an electrical outlet box or other equipment on a metal plate, rod or wooden block which spanned the space between adjacent stud members. The ends of the support members were bolted or otherwise secured to the studding and the outlet box or equipment was in turn attached to the supporting members by means of screws or bolts. Other practices of installing equipment particularly outlet boxes in the walls of buildings have included the provision of an opening in the wall into which the box was inserted with the flanges or ears on the box overlying the front face of the wall, or the use of a separate holder for the box which was resiliently snapped into the opening, thus, requiring no bolts or screws to maintain it in place. Where efforts have been made to support an electrical outlet box on a single stud member it was the practice to apply a plate across the legs of the channel and support the box on an arm extending outwardly from the plate.

It has been found that the above prior practices of mounting and supporting electrical equipment particularly outlet boxes in the construction of a wall or partition, presented a number of difficulties and undesirable features. For example, it was necessary to drill holes in the studding to attach the supporting members extending between adjacent studs. To properly position the box on the supporting members, additional drilling was necessary and the assembly secured together by means of screws or bolts. Such practice consumed an excessive amount of time, thus making the mounting of outlet boxes unreasonably expensive. Similarly, the mounting of an outlet box on a single stud member, as heretofore practiced, entailed a multiplicity of parts in varying sizes to suit requirements, thus large inventories were needed both on and off the job. The mounting of the outlet box directly in an opening in a wall was never particularly desirable because it was supported by the surrounding wall surface rather than independently thereof.

The channel member or studding with which the clip of the present invention is adapted to be employed may take various positions in the construction of a wall or partition. For example, the channel may be used vertically or horizontally as a part of a wall or partition or the channel may be part of a ceiling construction. In either case the fastening device or clip of the present invention can be readily applied to the outlet box or an electrical fixture without any special attaching means and the clip then applied to the channel member and when so applied will retain its fixed position.

Accordingly, it is among the objects of the present invention to provide a simple and efficient unitary fastening device for supporting an outlet box or electrical fixture from a channel shaped member which overcomes the drawbacks of prior practices and which is exceedingly simple and inexpensive to manufacture, may be readily assembled or mounted and presents a relatively rigid integrated structure.

Another object of the invention is to provide a fastening device or clip which may be assembled with one leg of a channel shaped structural member and is self clamping in a predetermined desired position independent of any bolts or other means of securement.

A still further object of the invention is to provide a lightweight, one piece clip member for supporting an electrical outlet box from a channel shaped member which is adapted to be resiliently mounted between the web and the inturned edges of the side wall of a channel shaped structural member.

Another object of the invention is to be provide a fastening device or clip for mounting on one leg of a channel shaped stud member which may be adjusted to support the face of an outlet box in various positions with respect to the leg of the channel member to compensate for varying thicknesses of wall board supported by the stud member.

A still further object of the invention is to provide a lightweight, one piece clip member for supporting an electrical outlet box from a channel shaped member which is adapted to be resiliently mounted between the web and the inturned edges of the side wall of a channel shaped structural member.

Another object of the invention is to provide a fastening device or clip for mounting on one leg of a channel shaped stud member which may be adjusted to support the face of an outlet box in various positions with respect to the leg of the channel member to compensate for varying thicknesses of wall board supported by the stud member.

A still further object of the invention is to provide a fastening device or clip which may be resiliently attached to one leg of a channel member and to which may be secured various types of supporting elements or accessories for receiving conduit, cable, electrical fixtures and the like.

Figure 1:
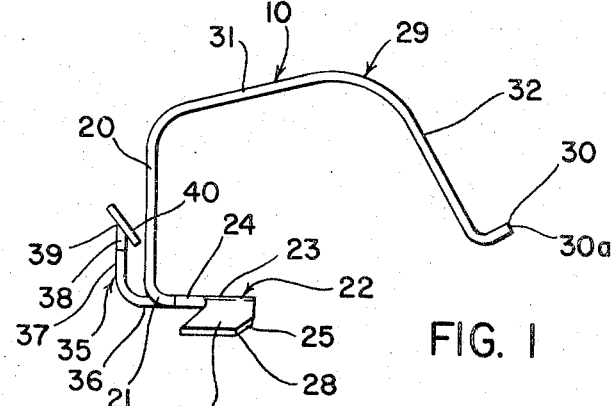
Figure 4:
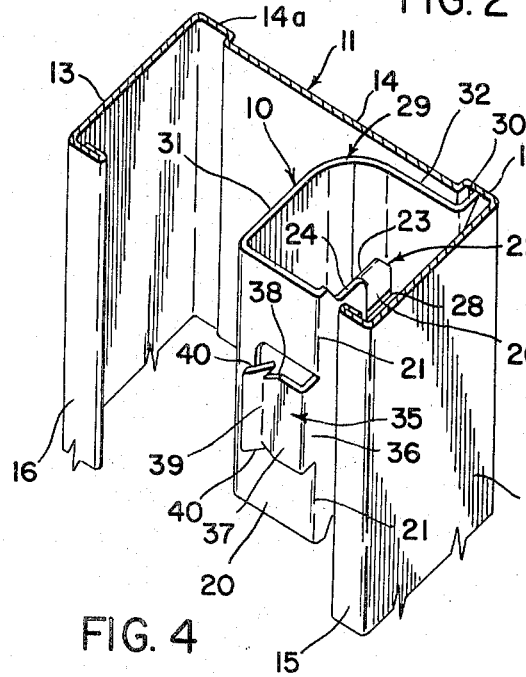
Figure 3:
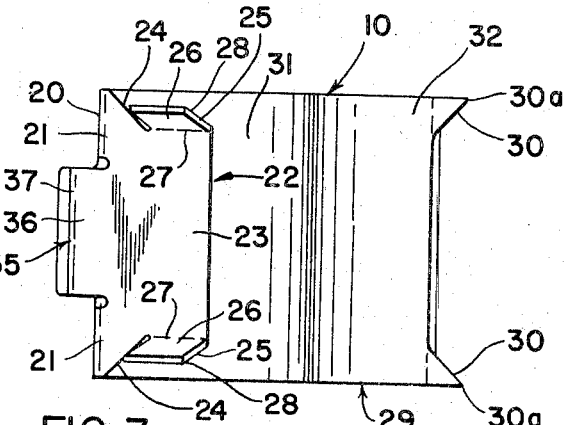
Figure 5:
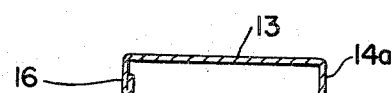
Figure 5:
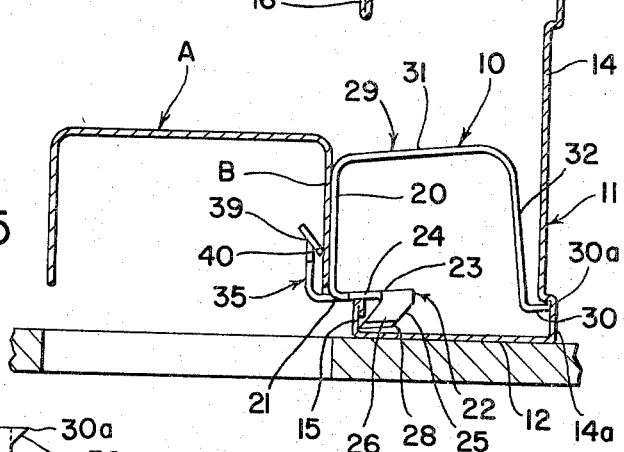
Figure 6:
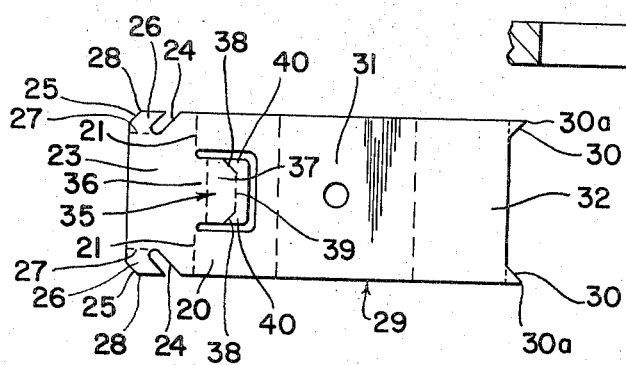

These and other objects and advantageous features of the present invention will become more apparent from the following detailed description of embodiments thereof taken in conjunction with the accompanying drawings wherein corresponding references characters throughout denote corresponding parts and wherein:

FIG. 1 is a side elevational view of a fastening device embodying the present invention, FIG. 2 is a front elevational view of the device of FIG. 1, FIG. 3 is a bottom plan view of the device of FIG. 1, FIG. 4 is a perspective view illustrating the fastening device of the present invention mounted within a channel shaped stud or structural member, FIG. 5 is a sectional view showing the fastening device of the present invention supporting an electrical outlet box within a section of a wall, FIG. 6 is a plan view of a blank from which one embodiment of the fastening device of the invention is formed, FIG. 7 is an exploded perspective view of a modified form of the present invention illustrating the various elements thereof, FIG. 8 is a side elevational view showing the modified fastening device in relative position with respect to a stud member for supporting an outlet box in a wall section, the latter being shown in phantom, FIG. 9 is a front elevational view taken on line 9—9 of FIG. 8, FIG. 10 is a fragmentary detail sectional view taken on the line 10—10 of FIG. 9, FIG. 11 is a plan view of a blank from which the supporting element of the device of FIG. 7 is formed, and, FIG. 12 is a plan view of a blank from which the clip of FIG. 7 is formed.

With reference to the accompanying drawings and particularly FIGS. 1 through 6 inclusive, there is illustrated a fastening device or clip, made in accordance with the teachings of the present invention, for supporting an electrical outlet box or other equipment from a channel shaped structural member, generally indicated by the numeral 10. The fastening device or clip 10 is formed of a suitable resilient sheet material such as spring steel strip. As shown in FIGS. 4 and 5 the device 10 is adapted to be assembled with an elongated channel shaped structural member such as a metal stud 11, having a pair of side walls 12 and 13 connected by a web or back wall 14. The central portion of the back wall is offset inwardly to form grooves 14a along each side wall 12 and 13, which serve to strengthen and add rigidity to the stud member 11. As will be noted hereinafter, the grooves 14a assist in the mounting of the clip within one leg of the channel member, however, the clip may be securely mounted within a channel where there are no grooves or bends along the web portion of the channel. Inwardly extending opposed flanges 15 and 16 are formed along the free longitudinal edges of the side walls 12 and 13 and extend substantially parallel with the back wall 14. The flanges 15 and 16 are reversely bent along the free edges thereof to present a reinforced or strengthened edge portion.

The fastening device 10 (FIGS. 1, 2, 3, and 6) formed of spring steel strip includes a substantially flat body portion 20, which extends somewhat parallel with the flanges 15 and 16 when the clip is assembled with the structural stud member 11. The end 21 of the body portion 20 is formed with means 22 for engaging the flange 15 on the side wall 12 and includes an angular extension 23 having opposed slots 24 cut inwardly from the opposite side edges thereof. The corners of the extension 23 are beveled to form surfaces 25 parallel with the walls of the slots 24. The surfaces 25 and slots 24 define tongues 26, which are adapted to be bent toward each other along the fold lines 27 to project outwardly from the extension 23. The tongues 26 present sharp points 28, the function which will become apparent hereinafter.

The opposite end of the body portion 20 is formed with an extension 29 the free end of which terminates in spaced angulated tongues 30 having sharp points 30a. The extension 29 is formed generally into a bow, the span of which is greater than the width of the side wall of the channel shaped structural member 11 when in an unassembled position. The extension 29 has a portion 31 extending at an angle in the same direction as the extension 21, with the balance thereof being gradually curved at 32.

The body portion 20 has integrally formed therewith a supporting tab 35 which defines a pocket for receiving the edge portion of the side wall of an outlet box "A" and serves to secure the same to the fastening device 10. The supporting tab 35 is formed by cutting out a portion of the body 20 and offsetting the same out of the plane thereof. The tab 35 comprises a wall portion 36 extending at substantially right angles to the body portion 20 and a wall portion 37, projecting from the portion 36 in a plane substantially parallel with the plane of the body portion 20. Extending inwardly from the opposite sides of the wall 37 are angulated slits 38. The free end of the wall portion 37 is flared outwardly along the fold line 39 connecting the inner extremities of the slits 38, thus forming prongs 40 on opposite sides of the wall 37 which project into the pocket defined by the wall portion 37 and the plane of the body portion 20.

In assembling the fastening device or clip with the channel 11 to support the outlet box "A" the edge portion of the side wall "B" thereof is inserted into the pocket or space between the body portion 20 and the wall 37 and the edge thereof is seated against the wall 36. The ends of the prongs 40, when the wall "B" is properly seated behind the wall 37, imbed themselves into the metal of the wall "B" and secure the fastening device and the outlet box together. The wall "B" of the box engages the surface of the body portion 20 and is supported thereby in a substantially rigid position.

In assembling the box "A" and fastening device 10 with the channel 11 the points 30a of the prongs 30 are inserted into the channel and caused to engage the web or back wall 14 adjacent the intersection thereof with the side wall 12. Pressure is applied to the body portion 20 closing the bowed or curved portion 32 of the extension 29 until the ends of the prongs 26 are brought below the flange 15. At this point the spring tension is released and the ends of the prongs 26 engage beneath the inturned flange 15 as is best shown in FIGS. 4 and 5. In this position the prongs 30 and the extension 23 of the body portion 20 lie substantially in the same plane, the wall "B" of the outlet box "A" is disposed parallel with the back wall 14 and the face of the outlet box is parallel with the outer surface of the side 12 of the channel shaped stud member 11. When the fastening device 10 is compressed into the position shown in FIG. 5 the various elements thereof are under spring tension and the tongues 26 and 30, bite into the inner wall surface of the flanges 15 and the back wall 14, respectively, and securely hold the fastening device and the outlet box supported thereby in fixed position within one leg of the channel member 11.

Referring now to FIGS. 7 through 12 inclusive, there is shown another embodiment of the invention, differing from that shown in FIGS. 1 through 6 in that the means for attaching the outlet box to the fastening device may be adjusted for use with walls of different thicknesses to properly position the open face of the outlet box with relation thereto. Again the fastening device is provided with a body portion 42 having an angulated extension 43 thereon which terminates in a bowed portion 44 having prongs 45 formed at the corners of the free end of the bowed portion 44.

Similar to the structure shown in FIGS. 1 to 6 inclusive the body portion 42 is formed with a flange engaging member 47 which is formed with opposed slots 48 extending inwardly from the opposite sides thereof. The corners of the extension 47 are cut away to form surfaces 49 parallel with the walls of the slots 48. The surfaces 49 and the slots 48 define tongues 50 which are bent toward each other along the fold line 51 to project outwardly from the extension 47 and present sharp points 51 adapted to engage below the inturned flange 15 of the stud member 11. The body portion 42 is provided with a series of spaced aligned slots 52 projecting inwardly from the opposite sides thereof. A screw receiving opening 53 in the form of a helix and radial slot is provided in the wall of the body portion 42.

A separate attaching member 55 is provided to secure the outlet box to the fastening device 41. The member 55 includes a wall portion 56 which is reversely bent along a fold line 57 (FIG. 9) to form a pocket 58 for receiving the edge portion of the side wall "B" of the outlet box "A". The reversely bent wall 59 of the body portion 56 is provided with angulated slits 60 extending inwardly from the edges thereof. The tongues 61 defined by the slits 60 and the side edges of the wall portion 59 are bent inwardly to project into the pocket 58. When a wall portion "B" of the outlet box "A" is inserted into the pocket the prongs 61 will bite into the metal of the wall of the box and maintain the same in fixed position. The body portion 56 is provided with an offset portion 62 which is adapted to engage the surface of the body portion 42. The width of the offset portion 62 is reduced to provide tabs 63 extending substantially at right angles to the offset portion 62 and the end of the portion 62 is inturned to provide a supporting leg 62a which engages the side wall of the box (FIG. 8) when the edge portion is seated within the pocket 58. Thus the wall "B" of the box "A" is supported at spaced points when engaged by the member 55 to make the connection therebetween more rigid. When the member 55 is seated on the body portion 42 of the clip 41 the tabs are adapted to engage the aligned slots 52 provided in the latter.

The offset portion 62 is provided with an elongated opening 64 which receives the threaded shank 65 of a bolt or stud 66. The stud 66 is adapted to engage the threaded opening 53 in the body portion 42 of the clip 41 when the member 55 is assembled thereon. In lieu of the stud 66 a a suitable rivet may be used to secure the offset portion 62 of the member 55 to the body portion of the fastening device 41. The provision of a mounting member 55 which can be adjustable positioned with respect to the body portion of the clip 41 and secured in such adjusted position makes it possible to use the fastening device of the present invention with any desired thickness of wall supported by the studs 11 as shown in FIG. 8 or may be employed to vary the relative position of the face of an outlet box with the outer surface of the side wall of the stud.

It will be understood that the above description is by way of illustration and in accordance with the provisions of the patent law, variations and further modifications of the specific structure disclosed therein may be made without departing from the spirit of the invention.

I claim:

1. A supporting clip for assembly with the base and one side wall of a channel shaped structural member wherein the edge of the side wall is inturned to form a flange along the edge thereof comprising a body portion, spaced prongs formed on one end of the body portion and arranged to engage beneath the said flange, an extension on said body portion extending toward the base of the channel shaped member and terminating in spaced prongs adapted to engage the said base, the space between the two sets of prongs being greater than the distance between the base of the channel and the inturned wall portion whereby the clip is resiliently maintained within the channel of the structural member when assembled therewith, and means on said body portion for receiving and supporting structural components from said channel shaped member.

2. A supporting clip for assembly with the base and one side wall of a channel shaped structural member wherein the edge of the side wall is inturned to form a flange along the edge thereof comprising a body portion, spaced prongs formed on one end of the body portion and arranged to engage beneath the said flange, an extension on said body portion extending toward the base of the channel shaped member and terminating in spaced prongs adapted to engage the said base, and means on said body portion for receiving and supporting a structural component.

3. A supporting clip as defined in claim 2 wherein the extension on the body portion is bowed toward the said one side wall of the channel shaped structural member and the distance between prongs on one end of the body portion and the prongs on the said extension is greater than the distance between the flange on the side walls and the base of the channel shaped structural member.

4. A supporting clip as defined in claim 2 wherein the said means for receiving and supporting a structural component is integrally formed with the body portion, includes a tab offset therefrom and defines therewith a pocket for receiving the edge portion of a wall of the component.

5. A supporting clip as defined in claim 4 wherein the tab is provided with prongs on the opposite sides thereof which project into the pocket and engage the wall of the component.

6. A supporting clip as defined in claim 1 wherein the means for supporting a structurel component is an attaching member adapted to be secured to the said body portion in adjusted positions.

7. A supporting clip for assembly with the base and one side wall of a channel shaped structural member wherein the edge of the side wall is inturned to form a flange along the edge thereof comprising a body portion, spaced prongs formed on one end of the body portion and arranged to engage beneath the said flange, an extension on said body portion extending toward the base of the channel shaped member and terminating in spaced prongs adapted to engage the said base, means for receiving and supporting a structural component in adjusted positions which includes an elongated wall portion reversely bent at one end to provide a pocket for receiving the edge portion of a wall of the component and the other end having tabs for engaging aligned slots formed in the body portion of the clip.

8. A supporting clip for assembly with the base and one side wall of a channel shaped structural member wherein the edge of the side wall is inturned to form a flange along the edge thereof comprising a body portion, spaced prongs formed on one end of the body portion and arranged to engage beneath the said flange, an extension on said body portion extending toward the base of the channel shaped member and terminating in spaced prongs adapted to engage the said base, means for receiving and supporting a structural component in adjusted positions including an elongated wall portion reversely bent at one end to provide a pocket for receiving the edge portion of a wall of the component and the other end having tabs for engaging aligned slots formed in the body portion of the clip, said body portion being provided with a threaded opening for receiving a stud extending through said elongated wall portion.

9. A supporting clip for assembly with the base and one side wall of a channel shaped structural member wherein the edge of the side wall is inturned to form a flange along the edge thereof comprising a body portion, an angular extension formed on one end of the body portion and extending substantially parallel with the said side wall of the structural member, outwardly projecting prongs formed on the end of said extension adapted to engage beneath the said inturned wall portion, an angular extension formed on said body portion projecting in the same direction as said first extension and terminating in prongs adapted to engage the base of the channel member, the space between the two sets of prongs being greater than the distance between the base of the channel and the inturned wall portion whereby the clip is resiliently maintained within the channel of the structural member when assembled therewith.

10. A supporting clip as defined in claim 9 wherein the second extension formed on the body portion is inwardly curved to bring the prongs formed on the end thereof in alignment with the prongs on the said first extension.

11. A supporting clip for assembly with the base and one side wall of a channel shaped structural member wherein the edge of the side wall is inturned to form a flange along the edge thereof comprising a body portion, an angular extension formed on one end of the body portion and extending substantially parallel with the said side wall of the structural member, outwardly projecting prongs formed on the end of said extension arranged to engage beneath the said inturned wall portion, an angular extension formed on the other end of said body portion projecting in the same direction as said first extension and terminating in prongs adapted to engage the base of the channel member, the space between the two sets of prongs being greater than the distance between the base of the channel and the inturned wall portion whereby the clip is resiliently maintained within the channel of the structural member when assembled therewith and means on said body portion for receiving and supporting a structural component.

12. A supporting clip for assembly with the base and one side wall of a channel shaped structural member wherein the edge of the side wall is inturned to form a flange along the edge thereof comprising a body portion, an angular extension formed on one end of the body portion and extending substantially parallel with the said side wall of the said structural member, outwardly projecting prongs formed on the end of said extension arranged to engage beneath the said inturned wall portion, an angular extension formed on the other end of said body portion projecting in the same direction as said first extension and terminating in prongs adapted to engage the base of the channel member, the space between the two sets of prongs being greater than the distance between the base of the channel and the inturned wall portion whereby the clip is resiliently maintained within the channel of the structural member when assembled therewith and means on said body portion for receiving and supporting a structural component, said means including aligned slots on the opposite side edges of the body portion, an attaching member having tabs engagable with the said aligned slots and reversely bent portion defining a pocket for receiving the edge portion of the wall of the component.

13. A supporting clip for assembly with the base and one side wall of a channel shaped structural member wherein the edge of the side wall is inturned to form a flange along the edge thereof comprising a body portion, an angular extension formed on one end of the body portion and extending substantially parallel with the said side wall of the said structural member, outwardly projecting prongs formed on the end of said extension arranged to engage beneath the said inturned wall portion, an angular extension formed on the other end of said body portion projecting in the same direction as said first extension and terminating in prongs adapted to engage the base of the channel member, the space between the two sets of prongs being greater than the distance between the base of the channel and the inturned wall portion whereby the clip is resiliently maintained within the channel of the structural member when assembled therewith and means on said body portion for receiving and supporting structural component, said means including an offset portion of the body portion defining a pocket for receiving the edge portion of the wall of the component.

14. A supporting clip for assembly with a channel shaped structural member comprising a body portion disposed between the sides of the channel member, spaced means on said body portion for securing the clip to the channel member, and means for supporting a structural component in adjusted position on said body portion including an elongated wall portion bent at one end to provide a pocket for receiving the edge portion of the component and interengaging surface areas on said wall portion and said body portion whereby the said pocket may be adjustably positioned with respect to the side walls of said channel member.

15. A supporting clip for assembly with a channel shaped structural member comprising a body portion disposed between the sides of the channel member, spaced means on said body portion for securing the clip to the channel member, and means for supporting a structural component in adjusted position on said body portion including an elongated wall portion reversely bent at one end to provide a pocket for receiving the edge portion of a wall of the component and the other end having tabs for engaging aligned slots formed in said body portion.

16. A supporting clip as defined in claim 14 wherein the body portion is provided with an opening for receiving a stud extending through the wall portion.

* * * * *